(12) United States Patent
Topcan

(10) Patent No.: US 12,470,088 B2
(45) Date of Patent: Nov. 11, 2025

(54) SYSTEM TO GENERATE ELECTRIC POWER TO CHARGE A BATTERY OF A VEHICLE AND METHOD THEREOF

(71) Applicant: L&T TECHNOLOGY SERVICES LIMITED, Chennai (IN)

(72) Inventor: Yunus Topcan, Hollywood, FL (US)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 1 day.

(21) Appl. No.: 18/430,713

(22) Filed: Feb. 2, 2024

(65) Prior Publication Data

US 2025/0211028 A1 Jun. 26, 2025

(30) Foreign Application Priority Data

Dec. 21, 2023 (IN) .............................. 202341087909

(51) Int. Cl.
  *H02J 50/10* (2016.01)
  *B60R 16/033* (2006.01)
  *H02J 7/34* (2006.01)
  *H02N 2/18* (2006.01)
  *B60L 53/50* (2019.01)

(52) U.S. Cl.
  CPC ............ *H02J 50/10* (2016.02); *B60R 16/033* (2013.01); *H02J 7/34* (2013.01); *H02N 2/18* (2013.01); *B60L 53/50* (2019.02)

(58) Field of Classification Search
  CPC ........... H02J 50/10; H02J 7/34; B60R 16/033; H02N 2/18; B60L 53/50
  USPC ....................................................... 307/10.1
  See application file for complete search history.

(56) References Cited

U.S. PATENT DOCUMENTS

| | | | |
|---|---|---|---|
| 8,091,677 B2 * | 1/2012 | Murty | B60K 6/442 180/65.265 |
| 9,971,353 B2 * | 5/2018 | Tripathi | B60L 53/38 |
| 10,449,848 B2 * | 10/2019 | Storm | B60W 10/08 |
| 2014/0012448 A1 * | 1/2014 | Tripathi | B60L 53/35 320/108 |
| 2017/0036671 A1 * | 2/2017 | Fukuchi | B60L 58/15 |
| 2021/0344214 A1 * | 11/2021 | Patel | H02J 7/1423 |

OTHER PUBLICATIONS

Weikang Jiang; Yuanyuan Song; Yongming Xu; Ran Zhou; Feng Sun; Xiaoyou Zhang; Energy-Harvesting Characteristics of a Dual-Mode Magnetic Suspension for Vehicles: Analysis and Experimental Verification; MDPI; Dec. 3, 2022; vol. 11—Issue 12.
Teslarati; Regenerative Shock Absorbers for Electric Vehicles; Sep. 27, 2013.
Zhanwen Wang, Tianming Zhang, Zutao Zhang, Yanping Yuan, Yujie Liu; A high-efficiency regenerative shock absorber considering twin ball screws transmissions for application in range-extended electric vehicles; Science Direct; Jan. 2020; pp. 36-49; vol. 1; Issue 1; China.

* cited by examiner

*Primary Examiner* — Alfonso Perez Borroto
(74) *Attorney, Agent, or Firm* — Kendal M. Sheets

(57) ABSTRACT

The present disclosure discloses a method and system designed to generate electric power by capturing and utilizing shockwaves generated from the interaction between the vehicle's tires and the road surface. The techniques of the present disclosure leverages tire vibrations, road irregularities, and vehicle acceleration to convert mechanical energy into electrical power, offering a sustainable and on-the-go solution for charging the vehicle's battery.

10 Claims, 6 Drawing Sheets

SYSTEM TO GENERATE ELECTRIC POWER TO CHARGE A BATTERY OF A VEHICLE AND METHOD THEREOF

The present disclosure generally relates to battery charging system. In particular, the present disclosure relates to a system and method for generating electric power to charge a battery of a vehicle.

BACKGROUND

In recent years, automotive industry has witnessed a significant shift towards electric propulsion systems, with vehicles increasingly powered by electric machines or a combination of electric machines and combustion engines. These electric vehicles (EVs) are equipped with energy storage units, commonly in the form of batteries, to store and supply electrical power. The demand for electrical power varies across different types of vehicles, and heavy-duty vehicles, such as trucks and buses, often require multiple batteries with substantial electrical storage capacity to ensure an adequate operational range.

However, the integration of numerous batteries into electric vehicles poses certain challenges. The weight of batteries contributes significantly to the overall mass of the vehicle, impacting its energy efficiency and performance. Furthermore, the spatial constraints within different vehicle types, determined by the wheelbase, influence the placement and arrangement of batteries. The available space between the front and rear wheel axles varies, affecting the potential configurations for accommodating energy storage units.

Further, conventional electric vehicles rely primarily on external charging stations or regenerative braking systems to replenish the energy stored in their batteries. While these approaches have proven effective to a certain extent, there remains a need for innovative solutions that can further enhance the energy efficiency of electric vehicles, especially during regular motion on roads.

The information disclosed in this background of the disclosure section is only for enhancement of understanding of the general background of the invention and should not be taken as an acknowledgement or any form of suggestion that this information forms the prior art already known to a person skilled in the art.

BRIEF SUMMARY

One or more shortcomings discussed above are overcome, and additional advantages and features are provided by the present disclosure. Other embodiments and aspects of the disclosure are described in detail herein and are considered a part of the disclosure.

In one non-limiting embodiment of the present disclosure, a system to generate electric power to charge a battery of a vehicle is disclosed. The system comprises at least one mounting surface coupled with at least one tire of the vehicle to receive shockwaves generated from the at least one tire when the vehicle is in motion, wherein the shockwaves are generated based on at least one of tire vibrations, road irregularities, and vehicle acceleration. The system further comprises a plurality of electric generators mounted on the at least one mounting surface and configured to generate the electric power using the shockwaves for charging the battery of the vehicle. The system further comprises a transfer means configured to transfer the generated electric power from the plurality of electric generators to the battery of the vehicle for charging the battery.

In another non-limiting embodiment of the present disclosure, the at least one mounting surface comprises a flexible material, and the at least one mounting surface is capable of being detachable from the vehicle. Further, the at least one mounting surface is coupled with the at least one tire of the vehicle directly or indirectly via coupling means. Furthermore, the coupling means comprises at least one of: metal structure, airflow system, and hydraulic means.

In yet another non-limiting embodiment of the present disclosure, each of the plurality of electric generators comprises at least one of: an inductive cell comprising: a coil of a metal wire arranged for electromagnetic induction, a magnet arranged to oscillate back and forth through center of the coil in response to the generated shockwaves to induce current through the coil, wherein the current is induced by the changing magnetic field in the coil, a spring to facilitate oscillation of the magnet, an inner cylinder assembling the coil and enabling the magnet to oscillate inside the coil, a shell arranged as a housing of the induction cell, and an elastic rubber arranged to prevent damage during strong impacts to ensure efficient magnet rebound; and piezoelectric materials configured to convert mechanical energy into electric power through the electromagnetic induction.

In yet another non-limiting embodiment of the present disclosure, the transfer means comprises a power management system configured to regulate the transfer of the electric power to the battery. The system comprises a backup energy storage device coupled with the plurality of electric generators to store excess electric power left after charging the battery.

In yet another non-limiting embodiment of the present disclosure, a method of generating electric power to charge a battery of a vehicle is disclosed. The method comprises receiving, using at least one mounting surface, shockwaves generated from at least one tire of the vehicle when the vehicle is in motion, wherein the shockwaves are generated based on at least one of tire vibrations, road irregularities, and vehicle acceleration. The method further comprises generating the electric power, using a plurality of electric generators, using the shockwaves for charging the battery of the vehicle, wherein the plurality of electric generators mounted on the at least one mounting surface. The method further comprises transferring, using a transfer means, the generated electric power from the plurality of electric generators to the battery of the vehicle for charging the battery.

In yet another non-limiting embodiment of the present disclosure, the method further comprises storing excess electric power, left after charging the battery, in a backup energy storage device coupled with the plurality of electric generators. The method further comprises regulating the electric power transferred to the battery via a power management system of the transfer means.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE SEVERAL VIEWS OF THE DRAWINGS

The embodiments of the disclosure itself, as well as a preferred mode of use, further objectives, and advantages thereof, will best be understood by reference to the following detailed description of an illustrative embodiment when read in conjunction with the accompanying drawings. One or more embodiments are now described, by way of example only, with reference to the accompanying drawings in which.

To easily identify the discussion of any particular element or act, the most significant digit or digits in a reference number refer to the figure number in which that element is first introduced.

DETAILED DESCRIPTION

Figure 1:
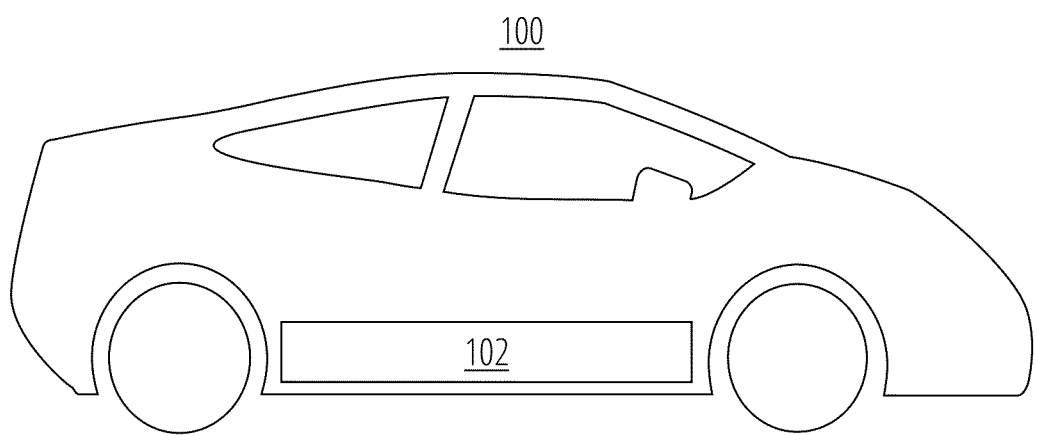
FIG. 1 illustrates a vehicle having a system configured to generate electric power to charge a battery of the vehicle in accordance with an embodiment of the present disclosure.

For the purpose of promoting an understanding of the principles of the invention, reference will now be made to the various embodiments and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms like "at least one" and "one or more" may be used interchangeably throughout the description. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The present disclosure addresses the above mentioned challenges by introducing a novel system designed to generate electric power by capturing and utilizing shockwaves generated from the interaction between the vehicle's tires and the road surface. This innovative approach leverages tire vibrations, road irregularities, and vehicle acceleration to convert mechanical energy into electrical power, offering a sustainable and on-the-go solution for charging the vehicle's battery.

FIG. 1 represents vehicle 100 having a system 102 configured to generate electric power to charge a battery of the vehicle 100 in accordance with an embodiment of the present disclosure. When the vehicle is in motion, shockwaves may be generated from tires of the vehicle 100 due to one or more of: tire vibrations, road irregularities, and vehicle acceleration, but not limited thereto. The system 102 is configured to generate electric power using the shockwaves generated in the vehicle 100. The system 102 may comprise a plurality of electric generators which may be mounted on one or more mounting surface in the vehicle 100. The electric generators may be configured to generate the electric power using shockwaves generated at tire of the vehicle 100 for charging the battery of the vehicle 100. The generated electric power may be transferred from the plurality of electric generators to the battery of the vehicle for charging the battery. In this manner, the present disclosure addresses the aforementioned challenges by introducing the novel system 102 that is capable of capturing shockwaves generated during the motion of the vehicle 100 and converting them into electric power for charging the vehicle's battery. The detailed structure and functionality of the system 102 is provided in the upcoming paragraphs in view of FIG. 2.

Figure 2A:
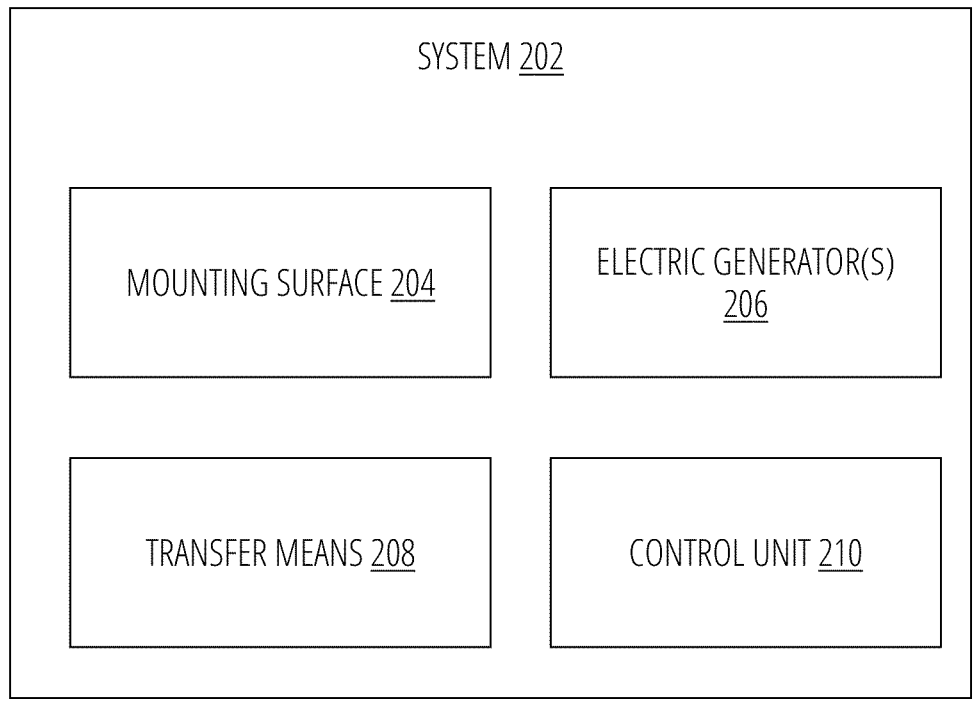
FIG. 2A illustrates a block diagram of the system in accordance with an embodiment of the present disclosure.

FIG. 2A illustrates a block diagram of the system 102 in accordance with an embodiment of the present disclosure. The system 102 (referred as 202 in FIG. 2) may comprise a mounting surface 204, electric generator(s) 206, transfer means 208, and a control unit 210, but not limited thereto. The mounting surface 204 may be made up of a flexible material and may be capable of being detachable from the vehicle 100. The mounting surface 204 may coupled with at least one tire 212 of the vehicle 100 directly or indirectly via coupling means to receive shockwaves generated from the at least one tire when the vehicle is in motion. The shockwaves may be generated based on at least one of tire 212 vibrations, road irregularities, and vehicle acceleration, but not limited thereto. In an embodiment, the coupling means may be at least one of: metal structure, airflow system, and hydraulic means, but not limited thereto. Further, the transfer means 208 may comprise a power management system configured to regulate the transfer of the electric power to the battery. The system 102 may also comprises a backup energy storage device which may be coupled with the plurality of electric generators 206 to store excess electric power left after charging the battery.

The system 102 utilizes the tiny electric generator(s) 206 that are engineered for compactness, efficiency, and seamless integration. These miniature generators are designed to be lightweight and space-efficient so that the electric generator(s) 206 may be placed on the mounting surface of the vehicle without compromising aerodynamics or adding unnecessary weight. Using the principles of electromagnetic induction, these tiny generators harness the shockwaves generated by tire vibrations, road irregularities, and vehicle acceleration. As these shockwaves reach the generators, they induce a magnetic field within the generator's coils and results in generation of electric current. The electric generator(s) 206 may be constructed to balance durability and weight considerations to withstand the mechanical stresses and vibrations experienced during the vehicle's motion. Further, the generators may be integrated in such manner that even if one or more generators face a temporary disruption or malfunction, others can seamlessly compensate, ensuring a continuous and reliable power generation process.

Figure 2B:
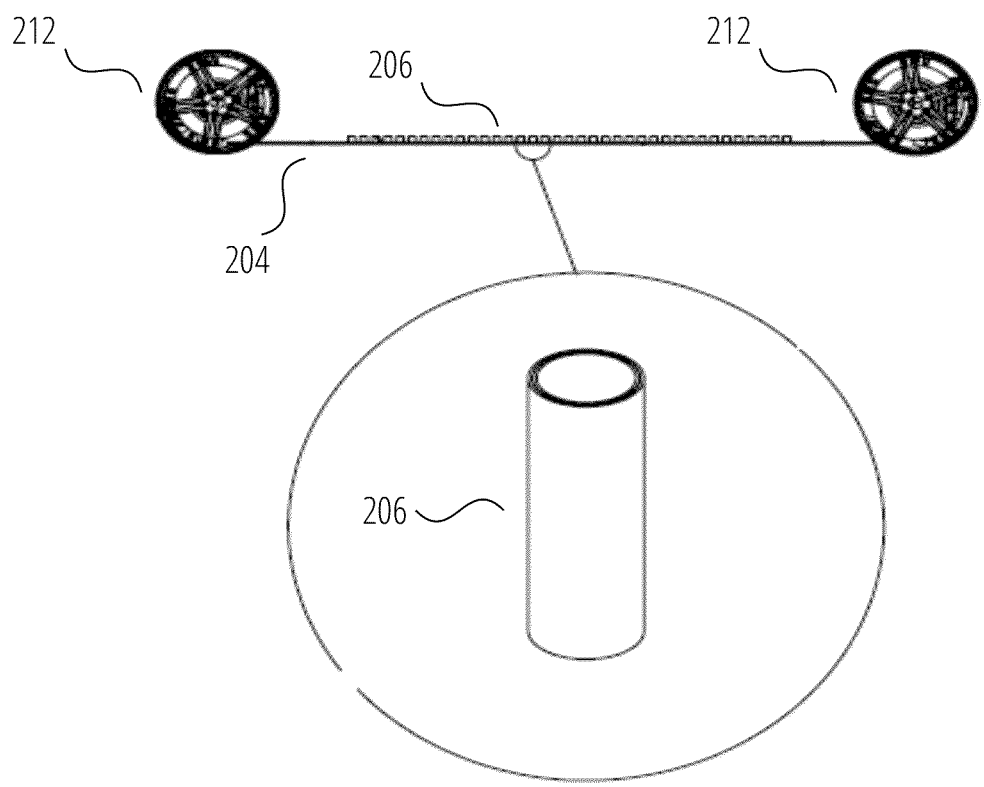
FIG. 2B depicts an exemplary arrangement of the mounting surface, the electric generator(s), and the tire in accordance with an embodiment of the present disclosure.
Figure 3:
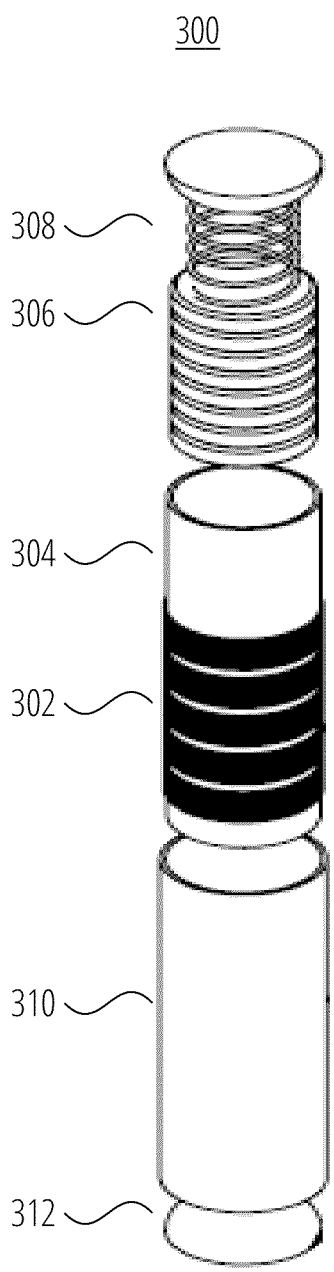
FIG. 3 illustrates the structure of the inductive cell in accordance with an embodiment of the present disclosure.

FIG. 2B depicts an exemplary arrangement of the mounting surface 204, the electric generator(s) 206, and the tire 212 in accordance with an embodiment of the present disclosure. As shown in the FIG. 2B, the mounting surface 204 may be attached between the tires 212. Further, the plurality of the electric generator(s) 206 may be arranged on the mounting surface 204 such that the electric generator(s) 206 may receive the shockwaves generated from the at least one tire 212 when the vehicle 100 is in the motion. A skilled person would appreciates that the mounting surface 204 may be placed at any space available in the vehicle 100. Further, there may be a plurality of the mounting surface 204 having the electric generator(s) 206, placed at different positions in the vehicle 100. In an embodiment, each of the plurality of electric generators 206 may comprises at least one of: an inductive cell and piezoelectric materials configured to convert mechanical energy into electric power through the electromagnetic induction. FIG. 3 illustrates the structure of the inductive cell.

As shown in FIG. 3, the inductive cell may comprise a coil 302, an inner cylinder 304, a magnet 306, a spring 308, a shell 310 and an elastic rubber 312, but not limited thereto. The coil 302 is of a metal wire which is arranged for electromagnetic induction. The magnet 306 may be arranged to oscillate back and forth through center of the coil 302 in response to the generated shockwaves to induce current through the coil 302. The current is induced by the changing magnetic field in the coil 302. Further, the spring 308 is arranged to facilitate oscillation of the magnet 306 and the inner cylinder 304 is used for assembling the coil and enabling the magnet 306 to oscillate inside the coil 302. The shell 310 is arranged as a housing of the induction cell 300. Further, the elastic rubber 312 is arranged to prevent damage during strong impacts to ensure efficient magnet rebound.

When the magnet 306 moves through series of small independent coils, the power is generated each time from small moves. The flux and voltage may increase as the magnet 306 enters the coil 302. With the magnet 306 completely inside, the voltage will stay close to zero until it leaves. In the present disclosure, short length series coils 302 and short length several magnets 306 may allow magnets 306 to travel through the coil 302 completely to be more effective. When there's a changing magnetic field in the induction cell wire coil there will be an induced current. The current that is created by the process of the magnet 306 sliding through the coil 302 received by circuit which will charge the battery. The magnet goes back and forth through the center of the copper wire coil when impact (i.e., kinetic energy) received, the electric energy is produced, which may be stored by the battery to be used by vehicle 100.

Figure 4:
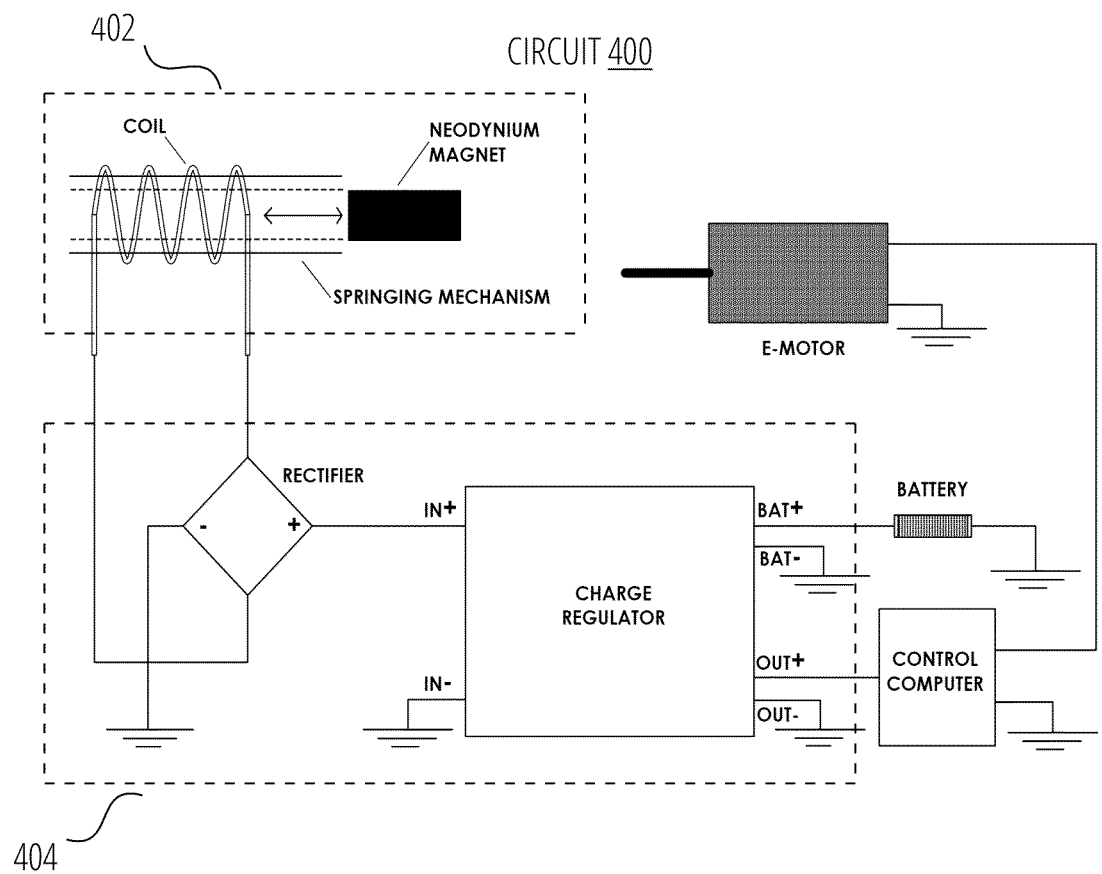
FIG. 4 illustrates a circuit diagram of the system in accordance with an embodiment of the present disclosure.

FIG. 4 illustrates a circuit diagram of the system 102 in accordance with an embodiment of the present disclosure. In the circuit 400, the coil and magnet represents a electric generator(s) 402 which is coupled to the battery by the transfer means 404. The current may be induced in the coil due to change in the magnetic flux as a result of movement of the magnet. The induced current may pass through a rectifier unit which may convert alternate current into direct current. Thereafter the rectified current may be used to charge the battery of the vehicle 100. The circuit 400 may also comprise a charge regulator to control the charging of the battery.

As disclosed, the system 102 comprises the plurality of electric generator(s) 206 mounted on the designated mounting surface(s) 204. These generators 206 are specifically configured to efficiently convert the received shockwaves into the electric power. By capturing and converting the kinetic energy present in the shockwaves, the generators 206 contribute to a sustainable and eco-friendly power source for the vehicle. Furthermore, the transfer means seamlessly conveys the generated electric power from the electric generators to the vehicle's battery. This transfer mechanism ensures an efficient and timely charging process, allowing the vehicle to utilize the harvested energy for propulsion or other electrical systems.

The disclosed system presents several advantages over conventional systems for electric power generation for vehicles. It provides a continuous and renewable source of energy during the vehicle's operation, reducing the dependence on external charging infrastructure. Additionally, the utilization of shockwaves generated during motion offers an eco-friendly approach to energy harvesting, aligning with the growing demand for sustainable transportation solutions. Overall, the invention introduces a system that leverages the inherent kinetic energy within the shockwaves of vehicle motion to generate electric power, thereby contributing to the advancement of energy-efficient and environmentally conscious transportation.

Figure 5:
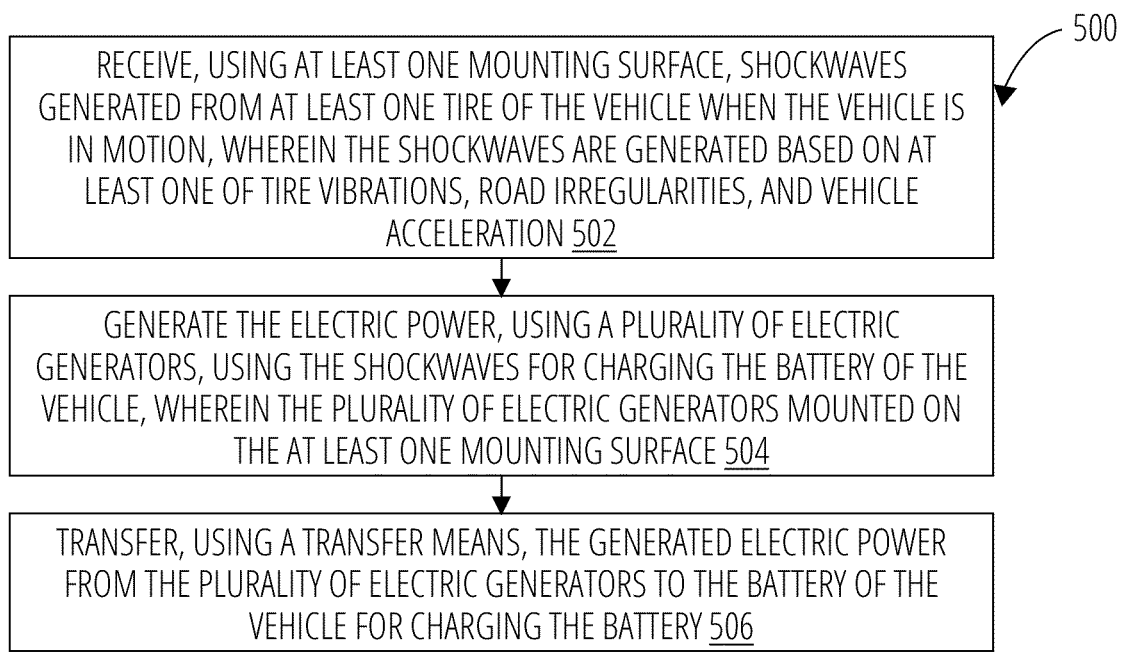
FIG. 5 illustrates a flowchart of a method of generating electric power to charge a battery of a vehicle in accordance with an embodiment of the present disclosure.

FIG. 5 of the present disclosure illustrates a flowchart of a method of generating electric power to charge a battery of a vehicle in accordance with an embodiment of the present disclosure. The blocks of the flow diagram shown in FIG. 5 have been arranged in a generally sequential manner for case of explanation; however, it is to be understood that this arrangement is merely exemplary, and it should be recognized that the functionality/processing associated with method 500 (and the blocks shown in FIG. 5) can occur in a different order (for example, where at least some of the functionality/processing associated with the blocks is performed in parallel and/or in an event-driven manner).

In block 502, the method 500 receives, using at least one mounting surface, shockwaves generated from at least one tire of the vehicle when the vehicle is in motion, wherein the shockwaves are generated based on at least one of tire vibrations, road irregularities, and vehicle acceleration. The at least one mounting surface may be coupled with at least one tire of the vehicle to receive shockwaves generated from the at least one tire when the vehicle is in motion. The at least one mounting surface comprises a flexible material, and may be capable of being detachable from the vehicle. The at least one mounting surface may be coupled with the at least one tire of the vehicle directly or indirectly via coupling means. The coupling means comprises at least one of: metal structure, airflow system, and hydraulic means.

In block 504, the method 500 generates the electric power, using a plurality of electric generators, using the shockwaves for charging the battery of the vehicle, wherein the plurality of electric generators mounted on the at least one mounting surface. Each of the plurality of electric generators comprises at least one of: an inductive cell and piezoelectric materials configured to convert mechanical energy into electric power through the electromagnetic induction. The cell may comprise a coil of a metal wire arranged for electromagnetic induction and a magnet arranged to oscillate back and forth through center of the coil in response to the generated shockwaves to induce current through the coil. The current may be induced by the changing magnetic field in the coil. The cell may further comprise a spring to facilitate oscillation of the magnet, an inner cylinder assembling the coil and enabling the magnet to oscillate inside the coil, a shell arranged as a housing of the induction cell, and an elastic rubber arranged to prevent damage during strong impacts to ensure efficient magnet rebound.

In block 506, the method 500 transfers, using a transfer means, the generated electric power from the plurality of electric generators to the battery of the vehicle for charging the battery. The transfer means comprises a power management system configured to regulate the transfer of the electric power to the battery. The method may further comprise storing excess electric power, left after charging the battery, in a backup energy storage device coupled with the plurality of electric generators. The method also comprises regulating the electric power transferred to the battery via a power management system of the transfer means.

In this manner, the method presents several advantages over conventional methods for electric power generation for vehicles. It provides a continuous and renewable source of energy during the vehicle's operation, reducing the dependence on external charging infrastructure. Additionally, the utilization of shockwaves generated during motion offers an eco-friendly approach to energy harvesting, aligning with the growing demand for sustainable transportation solutions. Overall, the invention introduces a method that leverages the inherent kinetic energy within the shockwaves of vehicle motion to generate electric power, thereby contributing to the advancement of energy-efficient and environmentally conscious transportation.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the detailed description.

The order in which the various operations of the methods are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

It may be noted here that the subject matter of some or all embodiments described with reference to FIGS. 1-5 may be relevant for the methods and the same is not repeated for the sake of brevity. The various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in Figures, those operations may be performed by any suitable corresponding counterpart means-plus-function components.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise. The terms "including", "comprising", "having" and variations thereof, when used in a claim, is used in a non-exclusive sense that is not intended to exclude the presence of other elements or steps in a claimed structure or method, unless expressly specified otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present disclosure are intended to be illustrative, but not limiting, of the scope of the invention, which is set forth in the appended claims.

What is claimed is:

1. A system to generate electric power to charge a battery of a vehicle, the system comprises:
    at least one mounting surface coupled with at least one tire of the vehicle to receive shockwaves generated from the at least one tire when the vehicle is in motion, wherein the shockwaves are generated based on at least one of tire vibrations, road irregularities, and vehicle acceleration;

a plurality of electric generators mounted on the at least one mounting surface and configured to generate the electric power using the shockwaves for charging the battery of the vehicle; and a transfer means configured to transfer the generated electric power from the plurality of electric generators to the battery of the vehicle for charging the battery.

2. The system of claim 1, wherein the at least one mounting surface comprises a flexible material, and wherein the at least one mounting surface is capable of being detachable from the vehicle.

3. The system of claim 1, wherein the at least one mounting surface is coupled with the at least one tire of the vehicle directly or indirectly via coupling means.

4. The system of claim 3, wherein the coupling means comprises at least one of: metal structure, airflow system, and hydraulic means.

5. The system of claim 1, wherein each of the plurality of electric generators comprises at least one of:

an inductive cell comprising:

a coil of a metal wire arranged for electromagnetic induction, a magnet arranged to oscillate back and forth through center of the coil in response to the generated shockwaves to induce current through the coil, wherein the current is induced by the changing magnetic field in the coil, a spring to facilitate oscillation of the magnet, an inner cylinder assembling the coil and enabling the magnet to oscillate inside the coil, a shell arranged as a housing of the induction cell, and an elastic rubber arranged to prevent damage during strong impacts to ensure efficient magnet rebound; and piezoelectric materials configured to convert mechanical energy into electric power through the electromagnetic induction.

6. The system of claim 1, wherein the transfer means comprises a power management system configured to regulate the transfer of the electric power to the battery.

7. The system of claim 1, further comprises a backup energy storage device coupled with the plurality of electric generators to store excess electric power left after charging the battery.

8. A method of generating electric power to charge a battery of a vehicle, the method comprises:

receiving, using at least one mounting surface, shockwaves generated from at least one tire of the vehicle when the vehicle is in motion, wherein the shockwaves are generated based on at least one of tire vibrations, road irregularities, and vehicle acceleration;

generating the electric power, using a plurality of electric generators, using the shockwaves for charging the battery of the vehicle, wherein the plurality of electric generators mounted on the at least one mounting surface; and transferring, using a transfer means, the generated electric power from the plurality of electric generators to the battery of the vehicle for charging the battery.

9. The method of claim 8, further comprises:

storing excess electric power, left after charging the battery, in a backup energy storage device coupled with the plurality of electric generators.

10. The method of claim 8, further comprises:

regulating the electric power transferred to the battery via a power management system of the transfer means.

\* \* \* \* \*